United States Patent
Abouelmaati

(10) Patent No.: US 10,420,024 B2
(45) Date of Patent: *Sep. 17, 2019

(54) TRANSMITTER OUTAGE DETECTION

(71) Applicant: British Telecommunications Public Limited Company, London (GB)

(72) Inventor: Dalia Abouelmaati, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/085,781

(22) PCT Filed: Feb. 24, 2017

(86) PCT No.: PCT/EP2017/054312
§ 371 (c)(1),
(2) Date: Sep. 17, 2018

(87) PCT Pub. No.: WO2017/162400
PCT Pub. Date: Sep. 28, 2017

(65) Prior Publication Data
US 2019/0053150 A1    Feb. 14, 2019

(30) Foreign Application Priority Data

Mar. 22, 2016   (EP) .................................... 16161676

(51) Int. Cl.
*H04W 52/02*  (2009.01)
*H04W 84/04*  (2009.01)
*H04W 84/18*  (2009.01)

(52) U.S. Cl.
CPC ..... *H04W 52/0206* (2013.01); *H04W 84/045* (2013.01); *H04W 84/18* (2013.01); *Y02D 70/00* (2018.01)

(58) Field of Classification Search
CPC ........... H04W 52/0206; H04W 84/045; H04W 84/18; Y02D 70/00
See application file for complete search history.

(56) References Cited

U.S. PATENT DOCUMENTS

2009/0117852 A1    5/2009  Loh
2015/0058481 A1*   2/2015  Miller ................. H04L 43/0876
                                                          709/224

FOREIGN PATENT DOCUMENTS

EP    2 154 918 A1    2/2010
EP    2 230 864 A1    9/2010
(Continued)

OTHER PUBLICATIONS

Dalia Abouelmatti et al., Femtocell Collaborative Outage Detection (FCOD) with Built-in Sleeping Mode Recovery (SMR) Technique, Conference Paper Apr. 2015, ResearchGate, pp. 1-5. (Year: 2015).*
(Continued)

*Primary Examiner* — Brandon J Miller
(74) *Attorney, Agent, or Firm* — Patterson Thuente Pedersen, P.A.

(57) ABSTRACT

An outage of a cellular base station is detected by a neighboring base station when a beacon signal previously stored by the neighbor in respect of the base station being monitored is compared with the result of a subsequent search for that signal and found to have deteriorated or ceases to be detected. If the search identifies such an event, the search is repeated at a shorter interval and an outage is reported to a management center if the base station also fails to be detected on subsequent consecutive sampling cycles. This avoids false alarms from reboots and other transitory losses of signal that would be caused by an outage report based on a single loss of signal.

6 Claims, 5 Drawing Sheets

(56) References Cited

FOREIGN PATENT DOCUMENTS

| EP | 2 693 810 A1 | 2/2014 | |
|---|---|---|---|
| EP | 2770772 A1 * | 8/2014 | ............ H04W 24/04 |
| EP | 2 800 425 A1 | 11/2014 | |
| WO | WO 2008/030171 A2 | 3/2008 | |
| WO | WO 2015/160296 A1 | 10/2015 | |
| WO | WO 2017/162399 A1 | 9/2017 | |

OTHER PUBLICATIONS

International Preliminary Report on Patentability for International Application No. PCT/EP2017/054309 dated Sep. 25, 2018; 8 pages.
International Preliminary Report on Patentability for International Application No. PCT/EP2017/054312 completed on May 15, 2018; 10 pages.
International Search Report and Written Opinion for International Application No. PCT/EP2017/054309 dated May 12, 2017; 11 pages.
International Search Report and Written Opinion for International Application No. PCT/EP2017/054312 dated Apr. 7, 2017; 10 pages.
Combined Search and Examination Report for GB Application No. GB1604866.2 dated Sep. 13, 2016; 6 pages.
Examination Report for GB Application No. GB1604866.2 dated May 8, 2018; 4 pages.
Wei et al.; "Cooperative Cell Outage Detection in Self-Organizing Femtocell Networks" INFOCOM, 2013 proceedings IEEE, Apr. 14, 2013, XP032440824, DOI: 10.1109/INFCOM.2013.6566865 [retrieved Dec. 3, 2018]; 9 pages. http://www.cse.ust.hk/~gswwang/Wei_files/papers/infocom13_cod.pdf.
Abouelmaati et al.; "Femtocell Collaborative Outage Detection (FCOD) with Built-in Sleeping Mode Recovery (SMR) Technique" Oct. 24, 2015, Springer, DE, XP055295003, ISSN: 1867-8211, ISBN: 978-3-642-17758-3 vol. 156, pp. 477-486, DOI: 1007/978-3-319-24540-9_39.
U.S. Appl. No. 16/085,765, filed Sep. 17, 2018, Inventor(s): Abouelmaati.
Application and Filing Receipt for U.S. Appl. No. 16/343,842, filed Apr. 22, 2019, Inventor: Abouelmaati.
International Search Report and Written Opinion for corresponding PCT Application No. PCT/EP2017/075237 dated Jan. 18, 2018, 16 pages.
3GPP TSG-RAN WG3 #75; Huawei, "Potential solutions for self healing", Agenda Item: 11.2; R3-120128; Dresden, Germany, Feb. 6-10, 2012; 3 pages total.
3GPP TSG-RAN WG3 #74; Huawei, Telefonica, Orange, "Clarification for Self-healing at RAN", Agenda Item: 11.6; R3-112773; San Francisco, US, Nov. 14-18; 3 pages total.

* cited by examiner

TRANSMITTER OUTAGE DETECTION

CROSS-REFERENCE TO RELATED APPLICATION

The present application is a National Phase entry of PCT Application No. PCT/EP2017/054312, filed Feb. 24, 2017, which claims priority from EP Patent Application No. 16161676.8, filed Mar. 22, 2016 each of which is hereby fully incorporated herein by reference.

TECHNICAL FIELD

This disclosure relates to self organizing communications networks, and in particular to an improved process for reconfiguring such networks as individual communications nodes lose contact with each other.

BACKGROUND

Self-Organizing Networks (SONs) have an important role in the development of the next generation of mobile networks by introducing automated schemes to allow base stations to be added and removed from the network without the need for human intervention to reorganize the network by updating neighbor lists, frequency allocations and other interactions between the base stations. The term "cell" as used herein means the area associated with each base station in which that base station is the primary means of communication between any mobile terminals currently in that area and the fixed "backhaul" infrastructure. In practice, the areas within which the individual base stations can make reliable contact with mobile terminals generally overlap to some extent, making it possible to hand over a mobile terminal from one base station to another without interruption. In a self-organizing network it is also necessary for each base station to be able to detect the presence of its neighbors, which may be done by direct wireless communication or through a supervisory system.

The terms "macrocell" "microcell" and "femtocell" are used herein in a relative sense to describe cells, and their associated base stations, with different sizes of areas of coverage. Typically a macrocell covers a range of a few kilometers, and a microcell covers a smaller area of where infill of the macrocell network is required either because of high traffic levels or difficulties in coverage by the macrocell network because of obstructions—a typical location is a city street. Femtocells are intended for very small coverage areas, typically indoors, and are useful both at sites with difficulties with reception and where high data rates are required. It is expected that future cellular networks will be heterogeneous networks (HetNets), i.e., a mix of macro-cells for ubiquitous user experience and small cells or femto access points (FAPs) for high data rate transmission.

Cell outage detection is one of the main functions required in a self-healing mechanism. Most outage detection algorithms are focused on macro-cells rather than small cells. Most previous outage detection algorithms are not suitable for such networks due to the dense deployment nature of FAPs in the HetNets, as compared to the macro only deployments. Furthermore, there is high possibility of having sparse user statistics in small cells, since they usually support very few users as compared to macro-cells. Macro cells tend to be associated with permanent base stations. It is also more common for smaller cells to be added and removed from the network, as they are usually under the control of individual users rather than the network operator, and the user may wish to power down the base station when he is not using it himself, or to take it to another location.

It is known to implement a distributed outage trigger mechanism and sequential hypothesis testing within a pre-defined cooperation range, by analyzing the Reference Signal Received Power (RSRP) statistics of the users within the cooperative range. The FAPs monitor their neighbors over the "X2" interface (Inter-eNodeB interface defined in 3GPP). These IP-based techniques are likely to result in network overload especially when, as is expected, many thousands of femtocells are deployed. Polling via X2 also generates additional network traffic, and suffers from the same reliability issues as centralized polling. Polling from a local Home Hub may be useful (especially in case where there are no neighbor Femto cells to report an outage) but is at risk of a common failure mode (hardware/power/backhaul) such that two or more neighboring cells may be affected by a common cause and thus none of them are able to report the outage.

Moreover, these systems do not take into account the possibility of devices going into sleep mode, so a FAP in idle/sleep mode will be mistakenly taken as an outage, which results in unnecessary compensation procedures, and more communications overhead.

"*Femtocell Collaborative Outage Detection with Built in Sleeping mode recovery*" (Abouelmaati et al: Lecture Notes of the Institute for Computer Sciences, Social informatics and Telecommunications Engineering, January 2015) describes a sleep recovery system in which FAPs report a sleep mode and then other femtocells process the data, replace the sleeping statistics, and then perform the Outage detection process. However, transitory but unplanned outages, or situations in which interference or other factors cause a sniffer to fail to detect a reference signal, may be mistakenly reported as outages.

SUMMARY

The present disclosure relates to a refinement in the "trigger" stage in which outages are only reported if a cell fails to be detected on consecutive sampling cycles.

According to the present disclosure, there is provided a wireless communications base station having a receiver for detecting wireless transmissions transmitted by other wireless base stations, a data store for storing reference transmission characteristics, a sensor for searching for transmissions received by the receiver from the other wireless base stations and having the reference transmission characteristics, and identifying if a transmission having the reference characteristics ceases to be detected by the monitoring system, and a reporting system for reporting a base station outage, the reporting system being configured to generate a base station outage report if transmissions having the reference characteristics are not detected by the sensor on a predetermined number of subsequent searches.

The disclosure also provides a method for reporting wireless base station outages, in which a plurality of monitoring systems have respective sensors which periodically search for wireless transmissions generated by wireless base stations having predetermined respective reference characteristics, and if one of the monitoring systems ceases to detect, in a predetermined number of periodic searches, transmissions having the predetermined reference characteristics associated with one of the wireless base stations, a transmitter outage report is generated in respect of that wireless base station for transmission to the other monitoring systems In the embodiment to be described, an outage is reported if a transmission, having failed to be detected once by the sensor, again fails to be detected after one further subsequent search. However, in suitable circumstances, such as environments with a higher probability of transmissions failing to be detected, or if the scan period is short compared with the length of a typical transitory power loss or reboot, it may be appropriate for the threshold to be set at two or even more subsequent negative scans before an outage can be confirmed.

In embodiments of the disclosure, the reference characteristics may be retrieved from a data store of transmitter characteristics. Alternatively, the data store may be populated by data identified by the sensor.

The monitoring system may be made responsive to reports of wireless base stations being added or restored to the network, by initiating or resuming scanning for transmissions with reference transmission characteristics associated with the added or restored wireless base stations after an outage has been repaired or a base station has otherwise been restored to the network.

The principle of not reporting an outage unless the transmission is absent in a number of successive searches (two searches in the embodiment to be described) seeks to avoid false outage alerts caused by temporary offline time because of, e.g., rebootings, and other transitory losses of signal.

The trigger stage in the prior system is replaced by a synchronized triggering action scheduled by the monitoring system, which removes dependency on the user equipment, resulting in less power consumption and communication overhead. Moreover, determining of sleep mode is not dependent on the actions of the user terminals.

This allows a simplified Sleeping Mode Recovery process. The Sleeping femtocell initially reports to other femtocells via an interface such as X2 or S-interfaces. The femtocells will then ignore this sleeping femtocell, running no processes and activating no sniffer for it until it is reported as active again.

In one arrangement, reporting is made to a centralized Operation Administration and Maintenance (OAM) server, taking outage management away from the mobile core network. This avoids the potential overloading of the network if large numbers of user equipment are deployed. It also avoids the need for the mobile base stations to have any knowledge of femtocells, which may not be included in their neighbor lists, and avoids any compatibility issues between the femtocells and mobile base stations.

To prevent false outage alarms, the femtocell does not report an outage until a duration long enough to confirm that it is not an accidental or routine disconnection (e.g for cleaning or rebooting). In addition the report of the sleeping mode can also be done via a pilot signal sent with the transmitted power (through the wireless channel).

Typically the outage reporting system is installed in a number of wireless femtocells, arranged to search to detect each other's transmissions, so that an outage of one of them is detected by its neighbors. The femtocells may also search for transmissions of other base stations which are not themselves equipped with the reporting system, so that outages of such base stations can also be reported. However, it is preferable that sufficient base stations be equipped with the reporting system to allow outage of any base station, including those fitted with the outage detection system of the invention, to be detected by at least one other base station fitted with the system.

In the embodiment to be described, an outage is reported if a transmission, having failed to be detected once by the sensor, again fails to be detected after one further subsequent search. In other words, an outage is reported if the sensor fails to detect the transmission on two successive attempts. However, more attempts may be permitted before an outage is reported. The appropriate number will depend on a number of factors, such as how frequently searches are made, and the likely duration of temporary stoppages, for example for a reboot.

In our co-pending International application filed on the same date as this application and claiming priority from European Application No. 16161677.6 entitled "Transmitter Outage Reporting", there is described a refinement in the "trigger" stage in which base stations which are shutting down report the impending outage to their neighbors, allowing them to avoid unnecessary use of resources on repeated attempts to detect a base station that has shut down.

Once they are informed by the sleeping base station that it is once again active, they will perform the dual-stage outage detection process described in the present application.

It will be understood that typically a base station will have the capability to operate as both a transmitting and a receiving station according to the disclosure. However, it is not necessary for all base stations in the network to have the power-loss reporting capability. Should such a base station lose power, it will simply cease transmission and be handled by other base stations as an unexpected outage. Likewise, if any base stations are not equipped to recognize recognise a loss-of-power signal and update the neighbor list accordingly, they will continue to scan for it in the conventional way. Thus base stations configured to operate in accordance with the invention may co-operate with conventional base stations in a communications network.

An energy-efficient process can be used to control "wake-up" from hibernation, in which the base station uses a sniffer and a micro controller to sense UE activity in order to switch between the sleeping and wakeup mode. When the base station senses UE activity, it wakes up only if the sensed UE is a subscriber to the network to which it is connected, thereby avoiding the unnecessary activation of the base station in case of presence of a non-subscriber UE in the vicinity. If no authorized UE activity is detected the shutdown process can be initiated, and the base station can inform the neighboring base stations that it is about to switch to the sleep mode. The collaborating base stations can then exclude this base station from the dual-stage detection. Consequently, the sleeping base stations will not be falsely detected as in outage. After the sleeping base station becomes active again, it can inform the collaborating base stations in order to be treated as normal.

The embodiment of the disclosure to be described uses interference signals between neighboring cells to detect outages of individual cells. If a signal ceases to be detected, the collaborative neighbors report it to the centralized Operation Administration and Maintenance system. This system requires little or no signaling overhead as each cell detects the normal transmissions of other cells.

In order to do this, each cell stores reference values, either retrieved from a look-up list provided by a central server, or stored as a record of recent sampling cycles, depending on whether the system is centrally organized or self organizing.

BRIEF DESCRIPTION OF THE DRAWINGS

An embodiment of the disclosure will now be described with reference to the drawings, in which.

DETAILED DESCRIPTION

This embodiment also incorporates the invention of our co-pending application referred to above claiming priority from EP 1616176.8, with which the present disclosure may co-operate, although each may also be used independently of the other.

Figure 1:
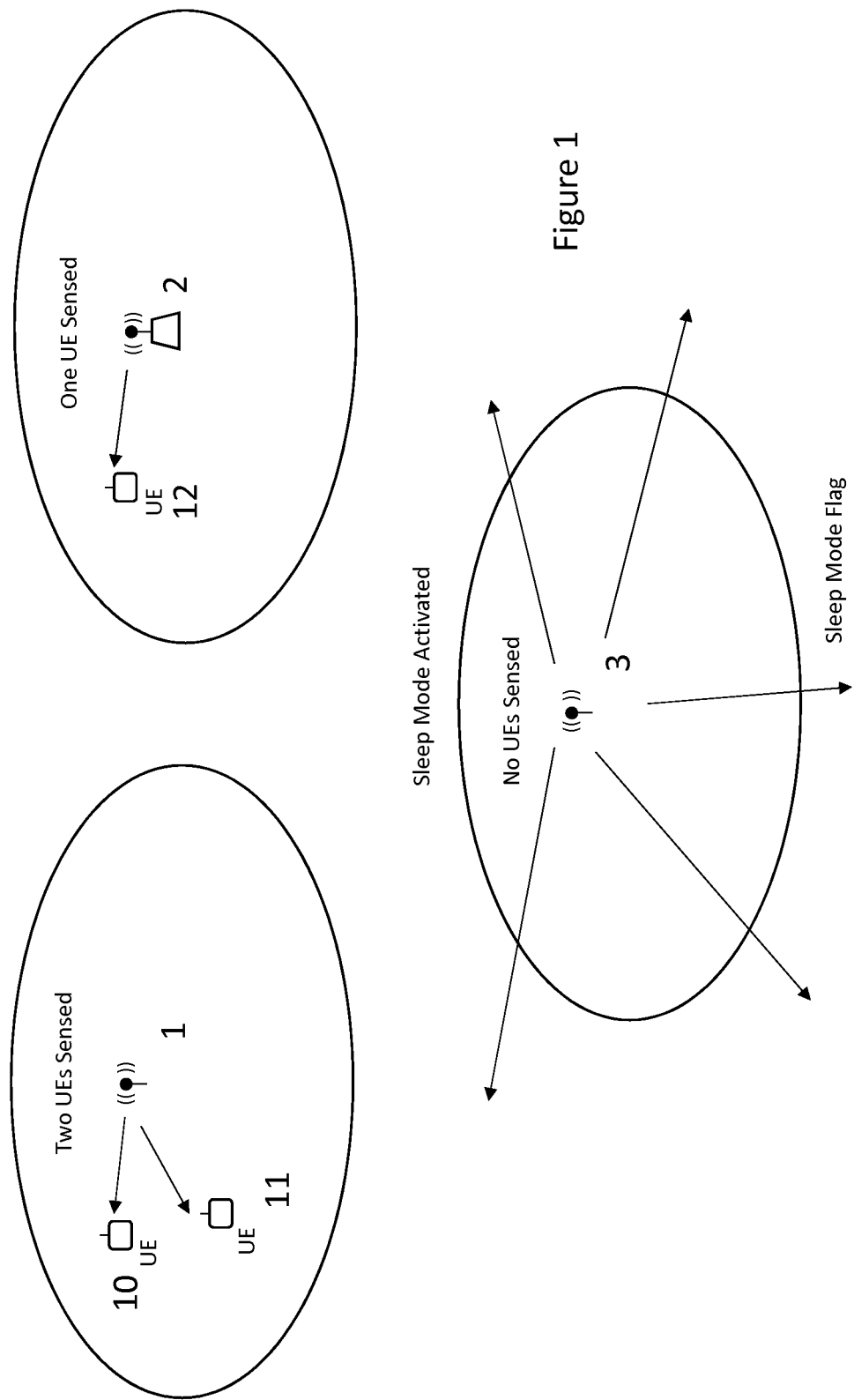
FIG. 1 is a schematic diagram representing a number of cellular base stations co-operating in the performance of the embodiment.

FIG. 1 depicts several base stations (femtocells) 1, 2, 3 and several user terminals 10, 11, 12, 14 capable of communication with the base stations when within wireless communication range of them. The coverage areas of the base stations may overlap, in which case handover of a mobile terminal is possible without interruption of service as the mobile station moves through the area within range of both. (It will be understood that there is no sharply-defined boundary to each base station's area of coverage, and the area depicted surrounding each base station in FIG. 1 should be taken as indicative only of the area within which signal quality exceeds some arbitrarily-defined value.) Thus a mobile terminal 14, at a greater distance, may still be able to communicate with the nearest base station. In practice, such areas are often of irregular shape, and may be of different sizes, depending on local topography, transmitter power, etc.

Figure 2:
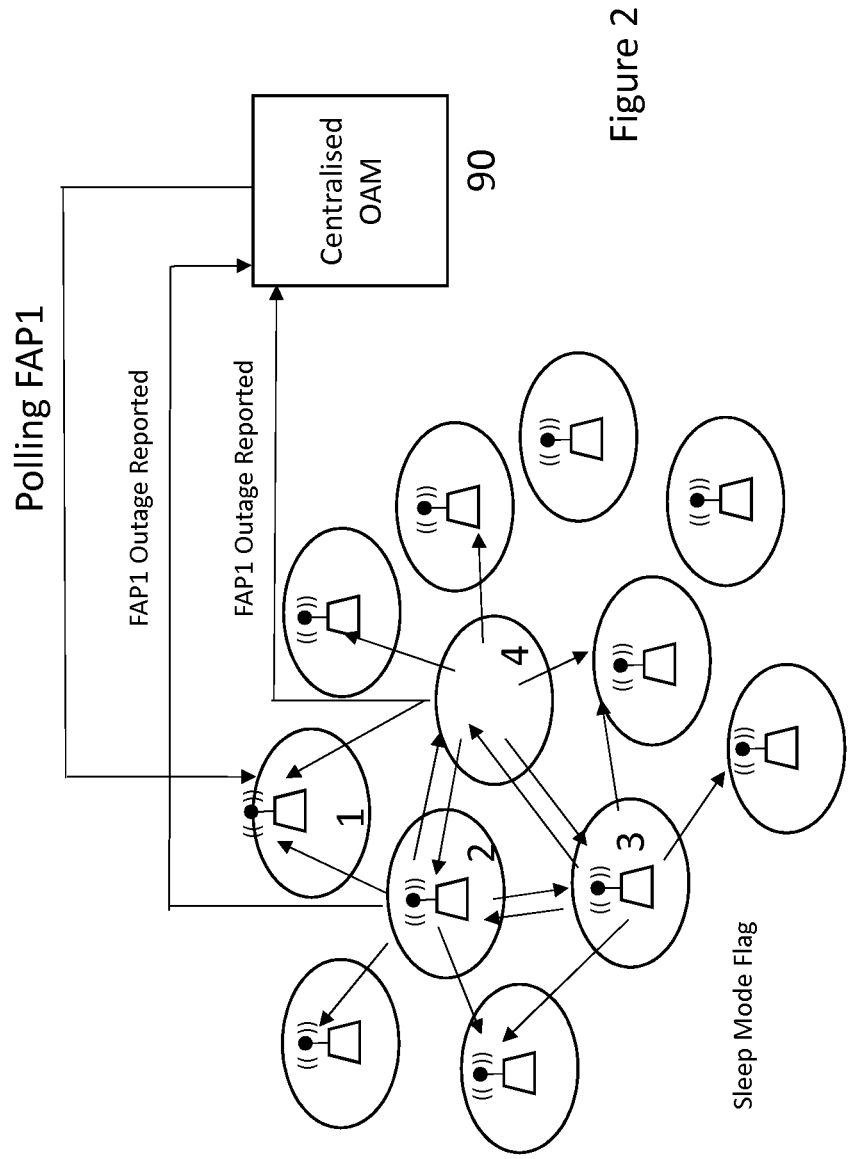
FIG. 2 is another schematic diagram representing a number of cellular base stations co-operating in the performance of the embodiment.

FIG. 2 illustrates a network of base stations (1, 2, 3, 4 . . . ) operating in conjunction with an operation, administration and maintenance center (OAM) 20 to perform the process of this embodiment.

The process uses interference signals from the collaborative neighbors to detect Femtocell Access Point (FAP) outages. As long as an FAP 1 radiates an interference signal to the neighbors 2, 4, it is evidence of its presence. An outage is reported if none of the base stations that previously detected it can still do so. The process excludes from the detection process any FAP 3 that has reported that it has performed a "graceful" shutdown, and is in "sleep" mode so as not to be mistakenly taken as an outage. Once an outage detection is confirmed by a neighbor cell 2 for a given femtocell 1, the neighbor cell reports it to a centralized Operation Administration and Maintenance center (OAM) 90. The OAM co-ordinates these reports with those from other neighbor cells 4, and if all of them report a shutdown or an outage of the femtocell in question, the OAM 90 may take further action to collect data about the outaged FAP 1, which could help in identifying the root cause of the outage. This allows patterns or trends to be monitored—for example clusters of alarms should be investigated for a common root cause.

The base stations are capable of transmitting beacon signals, and to scan for beacon signals transmitted by other base stations to allow each base station to determine what other base stations are nearby, to allow the base stations to operate as a self-organizing network in determining the frequency plan and signal strength to enable maximum coverage and minimum interference between base stations. The self-organizing system requires the base stations to co-operate with each other, usually under the overall control of an Operation Administration and Maintenance (OAM) system, to generate a frequency plan. The frequency plan controls the channels and the signal strength used by each base station to avoid interference between them. In particular, it is desirable that every mobile terminal in the area covered by the group of base stations should be able to communicate with at least one of the base stations, but no mobile station should be within range of two or more base stations operating, transmitting, or receiving on the same frequency.

The transmitter strength of the beacon signals is somewhat greater than that of the signals exchanged with the mobile terminals, as the beacons have to be detected by neighboring base stations, which will normally be further apart than the distance any mobile terminal would be from the base station it is working to. It is therefore desirable, both for power economy and interference reasons, to minimize the number of such signals and scanning sessions that are required.

The transmitter, typically a femtocell, has an internal electricity supply to operate a "graceful" shutdown process when the main power supply is cut off, and some limited functions during absence of an external supply. Femtocells may also power down into a sleep mode, if they are unable to detect any mobile stations in the vicinity, as shown for example for femtocell 3 in FIG. 1. In this mode, the base station continues to monitor for transmissions from mobile terminals which may come into range, but does not transmit a beacon signal until it detects a mobile terminal. A femtocell in this "sleep" mode will not be detectable by other base stations, which could therefore respond in the same way as if the sleeping femtocell has lost power.

Figure 3:
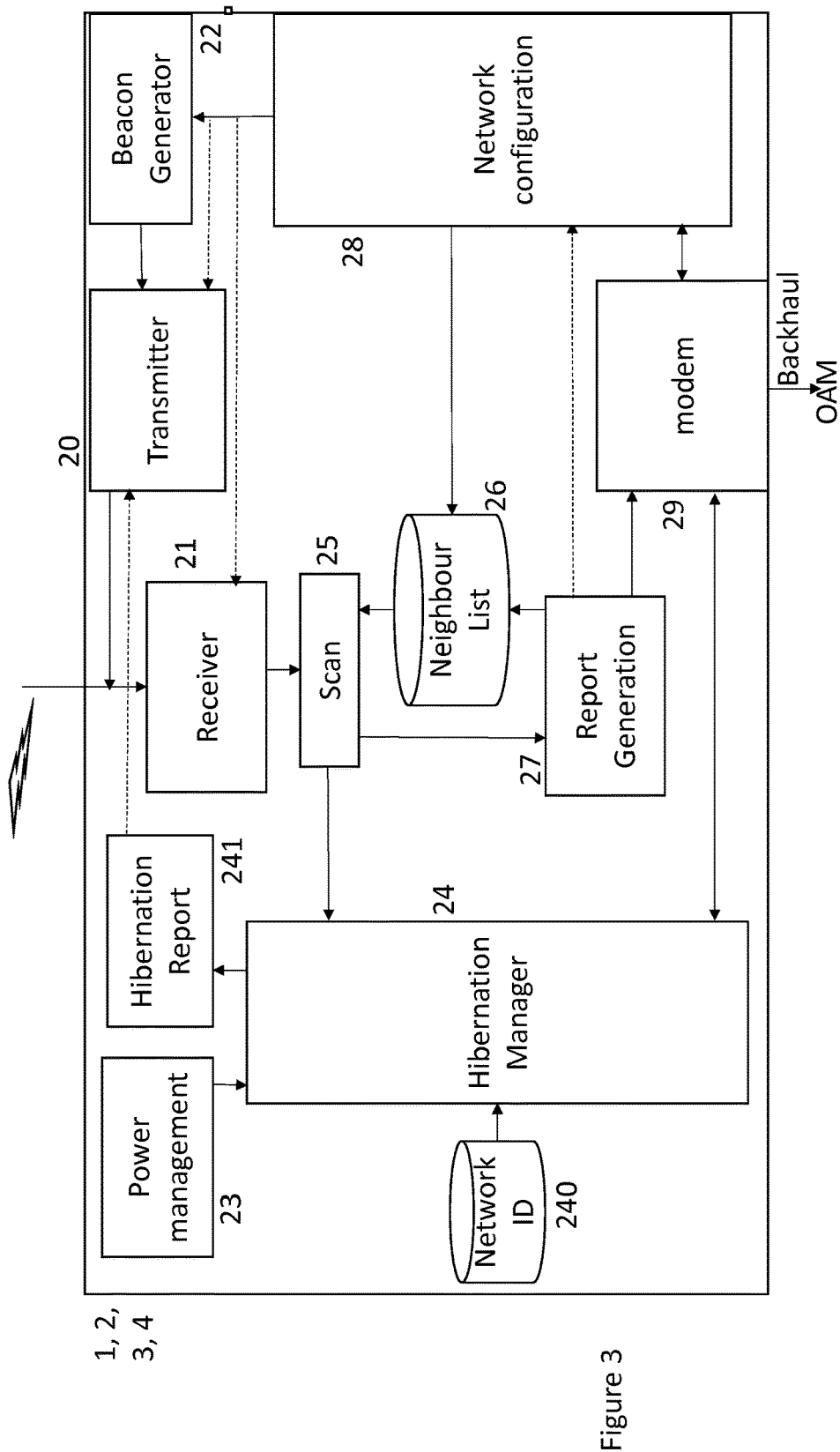
FIG. 3 is a schematic diagram of a base station configured to operate an embodiment of the disclosure.

A schematic diagram of the functional elements of one of the base stations 1, 2, 3, 4 is depicted in FIG. 3. It will be appreciated that the functions represented in FIG. 3 may be implemented as software or firmware, rather than as separate physical components. The base station comprises an RF interface comprising a transmitter 20 and a receiver 21, and a modem 29 connected through a communications network to the OAM 90. Communications traffic between mobile terminals and the network are handled through RF interface 20, 21 and the modem 29 in conventional manner.

When the base station is in operation a beacon generator 22 generates a signal for broadcast by the transmitter 20 to indicate to nearby receivers that the base station is in operation, and the channels it is operating on. A power management system 23 monitors whether the base station is connected to an external supply, and controls its transfer to a more limited function set or "sleep" mode when external power is disconnected. In particular, a hibernation manager 24 is activated which generates a "hibernation" report for broadcast by the transmitter 20 before closing it down. A chargeable battery is integrated within the Femtocell Access Point (FAP). Once the user unplugs the FAP for any reason (cleaning, at night, during holidays, etc.) the power management system 23 detects the loss of mains power and the FAP switches to Battery Mode and reports the unplugging to the monitoring device (OAM, MBS, Neighboring FAPs, etc.) before it switches off (in a few seconds). The FAP can use X2, S interfaces or radio signal to report the alarm. The other FAPs will stop monitoring this FAP, so no outage detection procedure will be performed on this FAP. That will prevent (False-Negative) the FAP from mistakenly considered to be in outage. This will eliminate time, effort and cost of the outage compensation procedures. Once the power cord is plugged again, the FAP reports the plugging alarm to the monitoring device. Consequently, the monitoring device will start the monitoring process (outage detection procedure) on this FAP.

A more limited hibernation process may also be activated if the receiver 21 detects no mobile terminals 10, 11, 12, within range. In this case the receiver continues to operate, at reduced power, so that if a mobile terminal comes within range it will be detected and the base station can resume operation.

The base station also has a scanning system 25 for monitoring signals received by the receiver 21 to detect beacon signals generated by other base stations within range, as well as any hibernation reports. These are compared with data stored in a neighbor list 26 and a report generator 27 updates the neighbor list with any changes. The report generator 27 may also report any hibernations or outages to the OAM 90 through the modem 29 and the communications network, and instructions received through the modem 29 for any reconfiguration required as the network changes are forwarded to a reconfiguration manager 28 which updates the neighbor list 26, instructs the beacon generator 22 if a change in beacon signal is required, and if necessary alters the transmitter and receiver channels and signal strengths. Alternatively, if the system is self-organizing, the network configuration system 28 may operate autonomously in response to reports from the report generation system 27 resulting from the scanning process 25.

The self-organizing system 28 updates the channel frequency plan as base stations are added or removed from the system. However, efficient updating of the frequency plan can be compromised by temporary losses of signal from individual base stations, resulting in computer processing power having to be used to generate a new frequency plan to accommodate the loss of the station, only to have to be reversed if the base station is detected again on the next scan. Reorganizing the frequency plan can also require several handovers of mobile terminals, again requiring processing power and running the risk of dropping some sessions.

Conversely, receiver power can be wasted in continuing to attempt to detect base stations which have been deliberately powered down. The present embodiment includes measures to allow a base station to announce a deliberate power down, so that other base stations can immediately take account of its absence in the self organizing process, and also includes measures to inhibit a base station from reporting to the self organizing system unexpected losses of contact until it can be established that the loss is not transitory.

The process operated in this embodiment will now be described with reference to FIG. 4.

It will be understood that the process requires the co-operation of two or more base stations, more than one of which may be of the type depicted in FIG. 3, and in the following description the reference numerals for the respective functional elements in each base station should be taken as a reference to the relevant component in the appropriate base station 1, 2, 3, 4. However, it should be understood that there may also be base stations in the network that only have a limited set of the capabilities of the base station depicted in FIG. 3. For example, the reporting by a first base station of an outage in a second base station according to this embodiment can take place whether or not the second base station is capable of performing the "graceful" hibernation function. If it does not have this capability, any loss of contact with it will be reported as an unexpected outage. Likewise, not all base stations in the network may be capable of reporting outages or hibernations of their neighbors.

Figure 4:
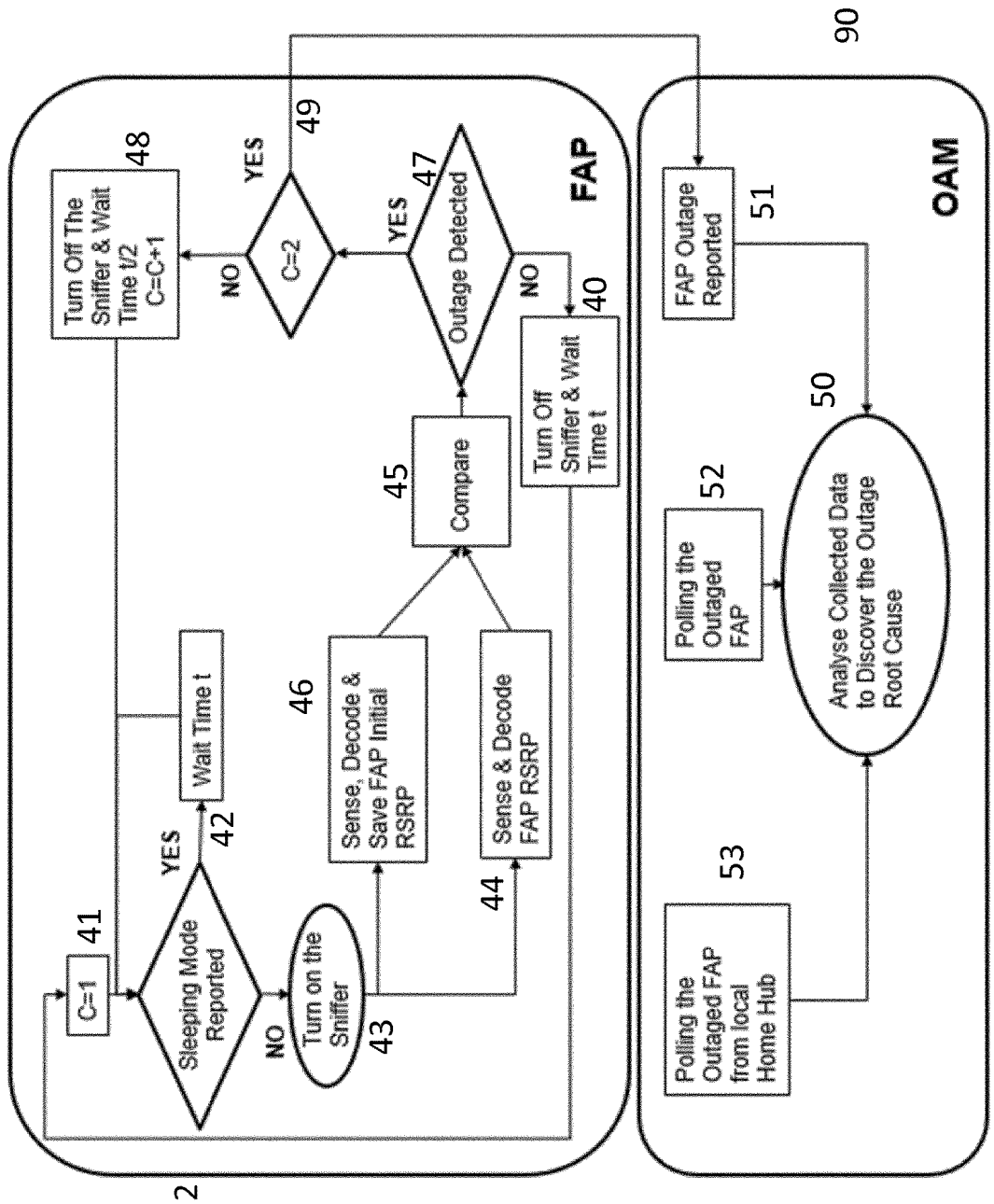
FIG. 4 is a flowchart for the operation of the outage reporting function of the embodiment, operated by a first base station and a coordinating server, detecting a shutdown or hibernation of a second base station.

The flow chart of FIG. 4 depicts the process by which a base station 2 or 4 (FIG. 2) detects an outage of another base station 1.

The dual-stage Outage detection is initiated in regular time intervals t (40). In the first stage of detection (Counter C=1) (41) each FAP 2, 4 within a certain collaborative range (R) monitors each neighboring FAPs' current RSRP statistics within a certain collaborative range. However, if a neighboring base station has reported that is in sleep mode, and that has been recorded in the neighbor list 25, the scanner is not operated in respect of that base station and the process waits for the scanning interval t before resuming 42). For other base stations in the neighbor list 25, the scanner searches for the beacon signal (43). The range will be determined according to the sensitivity of the scanner. The scanner 25 may also be used to sense the user terminal activity, but operating to detect base station transmission frequencies and with a sensitivity adjusted to take account of the typically greater distances between neighboring base stations than the range required for communication with a user terminal.

Having detected the current RSRP for a neighboring base station (44) statistics are compared to the initial RSRPs from previously stored benchmark data 25 (45). The benchmark data is frequently updated (46) for FAPs that have been introduced into the network, or re-introduced after a shutdown, or for which outage reports have been received, or for any other changes occurring within the collaborative range. If the decision statistic for a certain FAP is greater than a certain threshold value (T), this FAP (e.g. FAP 1) is recorded as a potential outage. Otherwise, the scanning process is completed and the scanner waits for the interval t (40)

If the comparison detects a potential outage (47) a second stage of detection takes place. If the counter is currently set at C=1, it is re-set to C=2 and the scanning interval reduced to t/2 (48) after which a second scan 43 will take place. This avoids the accidental removal or rebooting of the FAP to be mistakenly consider as an outage.

If on repeating the process (43, 44, 45, 47), with the counter now set at C=2, an outage is again detected (47) a decision is taken to report the FAP as suffering an outage and a report is transmitted to the OAM 90 (49)

The OAM 90 receives the report from the FAP 2 (51) and, together with similar reports from other FAPs (e.g. FAP 4) (52) and any information obtainable from the outaged FAP over its backhaul connection (53), performs an analysis (50) to determine the cause of the outage.

Centralized synchronization is used to manage the initiation of detection for the collaborative FAPs 2, 4. In addition to routine reports from FAPs 2, 4 having the outaged FAP 1 in their neighbor list, the OAM 90 may also initiate a polling process to cause a neighbor FAP 4 to make extra measurements in the event of a potential outage being reported, instead of waiting for the normal polling interval "t" to expire.

The initial decision for an outage to be reported to centralized Operation Administration and Maintenance (OAM) server is based on a decision statistic D, which is reported to the OAM assist the outage compensation process. The process will always be able to detect the outage regardless of the number of users within the collaborative range.

D is determined as follows:

$$D = RSRP - RSRP_0,$$

where RSRP is the normal RSRP statistics from the benchmark data and $RSRP_0$ is the sensed current RSRP statistic for a certain collaborative FAP.

The outage decision is based on the following equation:

$$D > T,$$

where T is a heuristically predefined threshold, which is dependent on the false alarm and misdetection rates.

The OAM will check the initial decision reported from the collaborative FAPs (FAP 2 and FAP 4) as shown in FIG. 3. If more than two FAPs within a certain collaborative range reported an initial decision of an outage for the same FAP, then the OAM will take the final decision that this FAP is in outage. The OAM will take further action to investigate this outage by polling the outaged FAP and request from the local home hub to poll it as well. Once these data are collected the OAM starts analyzing it to determine the root cause of the outage (Hardware, Backhaul, etc.). That will allow patterns/trends to be monitored. For example, clusters of alarms may be investigated for a common route cause.

Subsequently, the OAM will start the necessary outage compensation scheme with the aid of the reported decision statistic (D). For instance, automated compensation of power levels by neighboring Femto Cells (i.e. Automatic Power Control, but with the opportunity to respond more quickly based on detected outage of neighbor cell).

Figure 5:
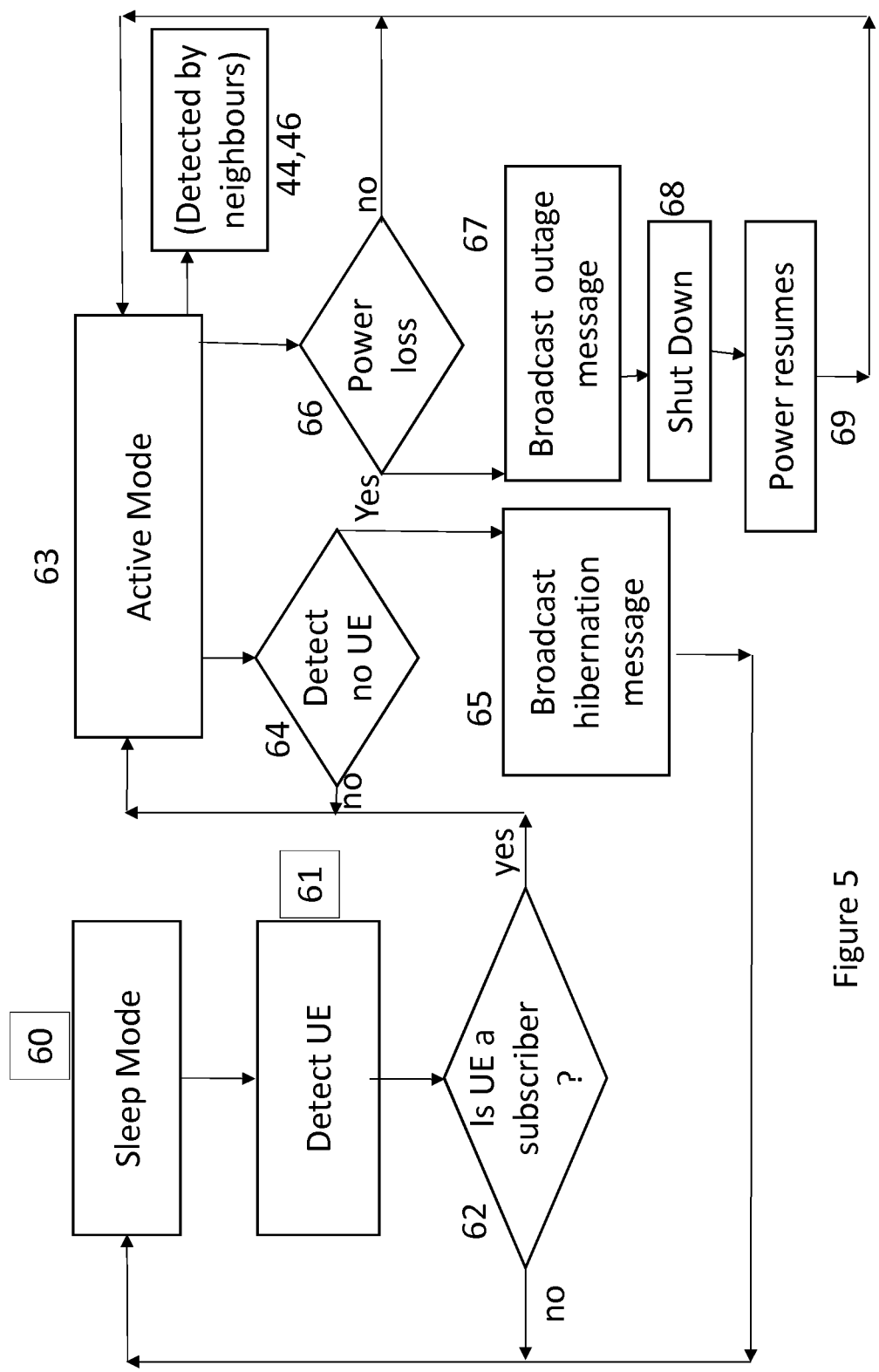
FIG. 5 is a flowchart of the sleep mode and shut down reporting function of the embodiment, as operated by a base station when it shuts down or hibernates.

The hibernation process will be discussed with reference to FIGS. 1 and 5, starting with the FAP in sleep mode (60). In this mode, the receiver and scanner are operating to detect any mobile terminals that are in the vicinity.

The FAP (femtocell) 3 is arranged to operate an energy-efficient process to control "wake-up" from hibernation, in which the femtocell 3 uses the scanner 25 and a hibernation management function 24 to sense activity of neighboring user terminals (also known as user equipment or UEs) in order to switch between the sleeping and wakeup mode. When the scanner 25 senses user terminals in the vicinity (61), it initiates a wake up process. In the first stage of this process it determines whether the UE detected (or any of them, if it detects more than one) is a subscriber for the network to which the FAP is operating (62), and only continues the "wake up" process if this is the case. Identification of the network to which a UE is operating may be done by reference to a data store 240 within the FAP, or by obtaining data on individual UEs from the OAM 90 through the backhaul connection through the modem 29. If a UE which can connect to the FAP 1 is identified, the hibernation manager activates the transmitter 20 and other functions (63), but the FAP is not activated and remains in Sleep mode (60) if the sensed UE is not its subscriber. This avoids the unnecessary activation of the FAP in case of presence of a non-subscriber UE in the vicinity.

Whilst in active mode, the FAP 4 can be detected by its neighbors 2, 3.

If, whilst in the active mode 53, the scanner identifies no authorized UE activity, a shutdown process 64, 65, 60 can be initiated, in which the FAP 3 informs the rest of the neighboring FAPs (FAP 2 and FAP 4 in FIG. 3) within the collaborative range before it switches to the sleep mode as shown in FIG. 2. The collaborative FAPs (i.e. FAP 2 and FAP 3), will exclude this FAP from the dual-stage detection.

Consequently, the sleeping FAPs will not be falsely detected as in outage. After the sleeping FAP becomes active again (step 63), it informs the collaborative FAPs 2, 4, which detect the FAP (44,46, FIG. 4) and treat it as a normal neighbor, and also reports its status to the OAM 90 through the modem 29.

In the event of the power management system 23 detecting that an external power supply has been disconnected or otherwise lost (66) whilst in the active mode 63, the hibernation manager 24 activates a report generator 241 which generates a report for transmission to neighboring FAPs 2, 4 (67) informing them that it is shutting down. (A similar report may be sent to the modem 29, to inform the OAM). The beacon generator 22, transmitter 20 and receiver 21 are then shut down (68) until power is restored (69) and the device is rebooted (returning to active mode 63). It should be noted that, unlike the condition when in sleep mode, when shut down the FAP is not scanning for user terminal (UE) activity.

Other FAPs, on receiving the sleep mode message 65 or the power outage message 67, update their neighbor lists 26 accordingly, so that when scanning (40, FIG. 4) they omit any FAPs reported as shut down or in sleep mode (42). Thus, the only FAPs that are reported by their neighbors as possible outages (47) are those that are not hibernating or have undergone a "graceful" shutdown. These remaining outages will be from causes not detected by the FAP itself, such as a transmitter failure, or interference from other transmissions. This allows the network operator, through the OAM, to filter outage reports so as to disregard outages triggered by customers turning off their base stations (FAPs) or when an FAP has gone into sleep mode. The process is also able to differentiate between cell outage and sleeping cells, and avoids false outage alarms generated from accidental unplugging or rebooting the FAP, minimizing the cost and effort generated by false alarms and misdetection.

The invention claimed is:

1. A wireless communications base station comprising:
   a receiver for detecting wireless transmissions transmitted by other wireless base stations;
   a data store for storing reference transmission characteristics;
   a sensor for searching for transmissions received by the receiver from the other wireless base stations and having the reference transmission characteristics, and identifying if a transmission having the reference transmission characteristics ceases to be detected; and
   a reporting system for reporting a base station outage, the reporting system being configured to generate a base station outage report if transmissions having the reference characteristics are not detected by the sensor on a predetermined number of subsequent searches.

2. The wireless communications base station according to claim 1, wherein the data store is populated by data identified by the sensor from transmissions received from neighboring wireless base stations.

3. The wireless communications base station according to claim 1, arranged to search for transmissions of wireless base stations which are not themselves equipped with the reporting system, so that outages of such wireless base stations can also be reported.

4. A method for reporting wireless base station outages, comprising:
   periodically searching, by respective sensors of a plurality of monitoring systems, for wireless transmissions generated by wireless base stations having predetermined respective reference characteristics; and if one of the plurality of monitoring systems ceases to detect, in a predetermined number of periodic searches, transmissions having the predetermined reference characteristics associated with one of the wireless base stations, generating a transmitter outage report in respect of that wireless base station for transmission to others of the plurality of monitoring systems.

5. The method according to claim 4, wherein the predetermined reference characteristics are retrieved from a data store populated by data identified by the sensor.

6. The method according to claim 4, wherein an outage is reported if a transmission, having failed to be detected once by the sensor, again fails to be detected after one further subsequent search.

* * * * *